United States Patent Office 3,681,215
Patented Aug. 1, 1972

3,681,215
MANUFACTURE OF ACRYLAMIDE-BASED
POLYMERS IN LIQUID AMMONIA
Marvin L. Peterson, Woodstown, N.J., assignor to E. I. du Pont de Nemours and Company, Wilmington, Del.
No Drawing. Filed May 28, 1970, Ser. No. 41,541
Int. Cl. C08f 1/18, 1/20
U.S. Cl. 204—159.23
22 Claims

ABSTRACT OF THE DISCLOSURE

Water-soluble polymers containing at least about 50 mol percent of acrylamide moieties are made by irradiating a liquid ammonia solution of vinyl monomer containing acrylamide and an organic acyclic azo compound.

BACKGROUND OF THE INVENTION

This invention relates to a process for making water-soluble polymers of acrylamide, both homopolymers and copolymers.

Water-soluble polyacrylamide and related water-soluble polymers containing both amide and carboxylic acid groups, and salts of the latter, are used extensively in the arts and in industry as components of adhesives, flocculating agents, flooding agents for petroleum recovery, grouts for foundations, soil stabilizers, paper additives, suspending agents, thickening agents, water-clarifying agents and the like. These water-soluble polymers conventionally are made by polymerizing acrylamide or mixtures of acrylamide with other vinyl monomers such as acrylic acid or its salts, or by partially hydrolyzing a polyacrylamide to convert some of the amide groups to carboxyl groups. The polymerizations usually are carried out in aqueous solutions using free radical initiators. Use of water as the reaction medium is both logical and desirable because water as a diluent helps to control the vigor of the exothermic reactions and is a low-cost reaction medium. A chain transfer agent, e.g. isopropanol, sometimes is included in the reaction mixture in order to reduce the molecular weight of the resulting polymer. The reaction products usually are aqueous solutions of polymers of medium to high molecular weight, generally in concentrations less than 10%. Practicably, for convenience in handling and to reduce costs of transportation, the aqueous solutions of polymeric material, e.g. polyacrylamide, must be used locally. Otherwise, the polymer must be recovered from the dilute aqueous reaction mixture either by precipitating the polymer by adding to the solution a water-miscible organic liquid that is a non-solvent for polyacrylamide, or by evaporating the water, both of which operations add appreciably to the manufacturing cost of the solid polymer, and if the removal of water is not carried out carefully the recovered polymer may be water-insoluble and substantially useless.

The manufacture of water-soluble polymers of acrylamide and water-soluble copolymers incorporating acrylamide is summarized, for example, in the "Encyclopedia of Polymer Science and Technology" (H. F. Mark, editor), vol. 1, p. 181 ff (1964). Some specific procedures employed in the manufacture of useful water-soluble polymers incorporating acrylamide moieties are disclosed in U.S. Pats. 2,827,964 and 3,002,960.

The problem of recovering polyacrylamide and its related water-soluble polymers from their reaction mixtures was partially solved by carrying out the polymerization of acrylamide in a solution containing an appreciable amount of organic solvent from which the polymer precipitated and could be separated easily, e.g., in a solution containing 35 to 90% of tert-butanol (U.S. 3,336,270 and British 1,102,708); by polymerization in ethanol containing 20–40% of water (U.S.S.R. 189,578—see CA 68, 3386v); by polymerization in a 3 to 6-carbon alcohol (German 1,195,050); by polymerization in acetone-water or acetone-water-tert-butanol mixtures (U.S. 3,509,113); by suspension-polymerization in organic solvents such as the monethyl ether of ethylene glycol (German 1,138,225), or other organic solvent containing water (German 1,264,782); or in a solvent containing 50% or more by weight of a $C_1$ to $C_4$ alkyl acetate (Japanese 3,832/69). But these processes did not overcome the added costs and inconveniences associated with the use of organic solvents in the reaction medium.

In general, processes are desired that can produce water-soluble polymers of relatively high average molecular weight and high viscosity characteristics, and means already are known for modifying such processes if a lower viscosity polymer is desired. Crosslinking of such polymers during manufacture increases molecular weight, but must be avoided or held to a very low level to retain water solubility. A method of polymerizing aqueous acrylamide in higher than usual concentrations to obtain water-soluble polyacrylamide of high molecular weight is disclosed in British 1,106,573 wherein ammonia is dissolved in the aqueous medium in which polymerization is accomplished. The concentration of ammonia so included, however, is relatively low, and the disadvantages of using an aqueous medium for the polymerization are not fully overcome, even though higher than normal initial concentrations of acrylamide monomer can be employed.

Thus, neither of the general procedures heretofore employed, viz, use of an organic liquid as diluent or addition of ammonia and amines, to overcome the disadvantages of polymerizing and copolymerizing acrylamide in predominantly aqueous media has been entirely satisfactory.

SUMMARY OF THE INVENTION

It has been discovered that water-soluble polymers of acrylamide, both homopolymers and copolymers of acrylamide with other vinyl monomers, can be produced relatively inexpensively in such a manner that the polymer is easily separated from the reaction mixture. More particularly, the invention comprises dissolving vinyl monomer containing acrylamide in an amount sufficient to produce a polymer having at least about 50 mol percent acrylamide moieties and an organic acyclic azo compound in liquid ammonia containing less than about 25% water wherein the ratio of vinyl monomer to ammonia is between about 1:1 and 1:50, preferably between 1:2 and 1:10; irradiating the mixture at a temperature below about 50° C. in substantial absence of oxygen, thereby producing easily separable solid, water-soluble polymer; and recovering the polymer from the reaction mixture. If excessive concentrations of vinyl monomer are used in the process, removal of heat and control of the exothermic polymerization reaction are difficult. Furthermore, the product separates in a solid mass that is difficult to handle in further processing. At lower ratios of vinyl monomer to ammonia the use of excessive ammonia not only can interfere with success of the synthesis, but also represents an economically wasteful practice.

The liquid ammonia used in the process can contain up to about 25% water, and many benefits of the invention are still realized. However, preferably, the liquid ammonia used in the process generally contains no more than about 8% water, and more preferably, the liquid ammonia is substantially anhydrous, i.e., contains less than about 1% water, because water in the reaction mixture is selectively retained by the polymer.

Acrylamide can be polymerized alone or in combination with another vinyl monomer to form a copolymer. The concentration of comonomer ingredient, e.g., ammonium acrylate, can exceed the concentration of acrylamide in the reaction mixture without obtaining a polymer containing more than 50 mol percent of the comonomer ingredient. This is a result of the differences in reactivity of the various vinyl monomers in the process of the invention. The concentration of comonomer, therefore, can be adjusted to give a copolymer of the desired composition, having at least 50 mol percent of acrylamide moieties, as exemplified herein.

The polymerization catalysts used in the process of the invention preferably are organic azo compounds that are employed in amounts at least sufficient to initiate polymerization. The polymerization catalysts are organic azo compounds in which the azo group, —N=N—, is acyclic and is bonded from both of the nitrogens to carbons that are aliphatic in character and at least one of which carbons is tertiary, i.e. attached to three other carbons by single valences, one of the carbons bonded to said tertiary carbon atom having its remaining valences satisfied only by oxygen and/or nitrogen. Examples of such catalysts are disclosed in U.S. 2,471,959 which is incorporated herein by reference. In the process of the present invention the organic azo compounds are in solution in liquid ammonia and are activated by radiation to form free radicals that catalyze the polymerization of acrylamide alone and with other vinyl monomers. Atlhough the amount of azo compound used varies depending on its effectiveness, generally the polymerization catalyst is present in quantities of from about 0.001 to 0.5% and, preferably, 0.01 to 0.1%, by weight based on the total weight of the reaction mixture. The reaction mixture containing acrylamide, with or without other vinyl monomers, and liquid ammonia together with the acyclic organic azo compound is irradiated to activate the catalyst thereby forming the free radicals that promote polymerization of vinyl monomer. Activation of the azo compound can be accomplished by any suitable radiation such as ultraviolet rays from daylight, black light fluorescent lamps, medium or high pressure mercury arc lamps, and even standard Mazda lamps. These sources provide more or less radiation in the effective range of wave lengths of from 175 to 500 millimicrons. The amount of radiation used must be at least sufficient to activate the azo compound. Generally, the source of radiation used is a commercial black light fluorescent tube or a medium pressure mercury arc lamp. Conveniently, and preferably, radiation used in the process has a wave length of from about 300 to 400 millimicrons.

The resulting solid water-soluble polymer made according to the process of this invention is of medium to high molecular weight, on the order of from 500,000 to 20 million, contains at least about 50 mol percent acrylamide moieties, and the polymeric material can be easily separated from the liquid ammonia, which is not a solvent for the polyacrylamide or copolymer therewith, by suitable physical methods such as decantation, filtration, centrifugation or the like. The filtrate or other residual liquid from which the polymer is separated, containing unused monomeric material and soluble low molecular weight polymer, can be reused in the process.

DESCRIPTION OF PREFERRED EMBODIMENTS

In the present process for preparing water-soluble polymers, in which acrylamide and liquid ammonia containing less than about 25% water is irradiated in the presence of certain organic azo compounds as polymerization catalysts, the reaction mixture can also contain other vinyl monomers to produce copolymers of acrylamide containing at least 50 mol percent acrylamide moieties, the balance being other vinyl monomer moieties. Accordingly, the term "polymer" as used herein includes homopolymers of acrylamide and copolymers that contain at least 50 mol percent of acrylamide moieties. The vinyl monomers used to form copolymers of acrylamide must be soluble in liquid ammonia, and the polymeric products prepared from these monomers must be insoluble in liquid ammonia. Vinyl monomers are well known in the art, and those that are particularly suitable include (a) acrylonitrile; (b) vinyl chloride; (c) vinyl monomers containing hydrophilic salt groups, for example, metal or ammonium salts of vinyl carboxylates such as sodium acrylate, vinyl sodium sulfonate, vinyl quaternary ammonium salts such as β-methacryloxyethyl trimethyl ammonium sulfate and diallyl dimethyl ammonium chloride; styrenes having as ring substituents hydrophilic salt groups such as the ammonium salt of vinyl benzene sulfonic acid and vinyl benzoic acid; (d) vinyl pyridines such as 2-vinyl pyridine, N-vinyl pyridine; (e) alkyl acrylates in which the alkyl group contains not more than four carbon atoms, such as methyl acrylate; (f) alkyl vinyl ethers in which the alkyl group contains up to four carbon atoms, such as ethyl vinyl ether; (g) alkali metal and ammonium salts of ethylenically unsaturated dibasic acids such as maleic and itaconic acids; and (h) maleimide.

The liquid ammonia used in the process functions as a solvent for acrylamide and other vinyl monomers, e.g. acrylic acid, that are used in the process. Anhydrous or substantially anhydrous liquid ammonia is especially preferred as the reaction medium for carrying out the process of the invention. However, as mentioned above, liquid ammonia containing up to about 25% water can be used. When the concentration of water in the liquid ammonia is above about 25%, the polymer, either homopolymer or copolymer, selectively retains sufficient water that it becomes excessively sticky, agglomerates and consequently is difficult to handle during separation and recovery. Furthermore, reuse of the mother liquor is less satisfactory or even may become impractical as the concentration of water in the liquid ammonia increases.

The polymerization reaction is catalyzed by organic azo compounds, as described above, that funtcion as initiators under the influence of radiant energy. The azo catalysts that are used are well known in the art and are chemically identified as organic azo compounds wherein the azo group, —N=N—, is acyclic. Such azo-type free-radical polymerization catalysts are available from E. I. du Pont de Nemours and Company and the Lucidol Division of Wallace and Tiernan, Inc., and others are described in U.S. 2,471,959. Especially good results are obtained when the acyclic azo catalysts used in the process of this invention are azobis(isobutyronitrile), azobis(α,γ-dimethylvaleronitrile) and azobis(isobutyramidine) - hydrochloride.

The reaction mixture is irradiated in order to activate the azo-type free radical polymerization catalyst. Ionizing radiation can be used to polymerize vinyl monomers in liquid ammonia, but such is not necessary because less intense and easily usable forms of irradiation are suitable when used in combination with organic acylic azo compounds, as described above. For example, even a 100-watt incandescent light bulb has been found to be satisfactory, although much less effective than sources from which the radiant energy is primarily in the wave length range of about 175 to 500 millimicrons, and especially from about 300 to 400 millimicrons wave length.

The concentration of vinyl monomers in the liquid ammonia reaction medium can vary from about 2% up to about 50% of the total solution weight. Preferred concentrations of vinyl monomers that are soluble in the liquid ammonia are in the range of about from 10 to 40% of the weight of the reaction mixture.

The temperature employed during the reaction can vary over a wide range of from $-80°$ to $+50°$ C. Generally the temperature is lower than about 50° C., and preferably the reaction temperature used is from about 0° to $-30°$ C., although lower temperatures are operative. At temperatures above about 50° C., side reactions of vinyl monomer with ammonia become significant, and hence are to be avoided.

The pressure of the reaction system generally is autogenous and is related to the temperature of the reaction mixture. Operation under reflux conditions within the preferred temperature range provides a convenient means for removing the heat of reaction and thereby controlling the polymerization process. As mentioned above, the reaction can be conducted at temperatures below −30° C., but reaction rates are much lower, and hence the lower temperatures are not preferred.

The resulting polymers of acrylamide of this invention contain from 100% acrylamide moieties to those containing, in addition to acrylamide moieties, up to about 50 mol percent of other vinyl monomer moieties. The following examples illustrate the preparation of solid water-soluble polyacrylamides in accordance with this invention. All parts and percentages are by weight unless otherwise indicated. Anhydrous ammonia, unless otherwise specified, is the commercially anhydrous grade containing a maximum of 0.5% water. The source of irradiation produced energy having wave lengths between 175 and 500 millimicrons.

EXAMPLE 1

A solution containing 240 parts of acrylamide, 550 parts of anhydrous liquid ammonia and 2.5 parts of the initiator azobis(isobutyramidine)hydrochloride is placed in a reactor equipped with a Dry Ice-cooled condenser and a nitrogen inlet. The gas space of the reactor is flushed with dry nitrogen. A glass finger enclosing a 4-watt General Electric blacklight fluorescent tube is inserted into the center of the reaction mixture, and the mixture is irradiated for 4½ hours at atmospheric pressure and −30° C. This treatment produces a slurry of solid, nontacky, water-soluble polyacrylamide in liquid ammonia. The polymer (83.7 parts) is separated from the reaction mixture by filtration and is washed with methanol to remove unreacted residual monomer and solvent, and is dried at reduced pressure.

The molecular weight of the polymer is determined by measuring the reduced specific viscosity. For this, a sample of 0.1 g. of the above dry polymer is dissolved in 1 N sodium chloride solution to make 100 ml. of solution. The flow time of the solution in an Ubbelohde-type viscometer is determined. The flow time of a solution of 1 N sodium chloride in the same viscometer at the same temperature also is measured. The reduced specific viscosity is defined as $\eta_{sp/c}$, where $c$ is the concentration of polymer in grams/deciliter, $$\eta_{sp} \text{ (the specific viscosity)} = \frac{t}{t_0} - 1$$

wherein $t$ is the flow time of the polymer solution and $t_0$ is the flow time of the solvent. The reduced specific viscosity of the above sample of polymer is 11.9, which corresponds to an average molecular weight of about 4,000,000. The average molecular weight (viscosity average), $\overline{M}_v$, is computed from the intrinsic viscosity using the relationship:

$$[\eta] = 3.73 \times 10^{-4} \overline{M}_v^{-0.66}$$

wherein $[\eta]$ is intrinsic viscosity (see, for example, Sorenson and Campbell, "Preparative Methods of Polymer Chemistry," 2nd ed., p. 44 (1968)).

EXAMPLE 2

A solution containing 60 parts of acrylamide, 70 parts of anhydrous liquid ammonia and 0.02 part of azobis(isobutyramidine)hydrochloride is placed in a glass resin-flask equipped with a Dry Ice-cooled condenser and nitrogen inlet. The bask first is flushed with nitrogen, then the solution of acrylamide is irradiated by a 100-watt Hanovia medium pressure mercury arc lamp placed 4 inches from the bottom of the flask, the contents of which are at a temperature of about −30° C. After irradiation for 30 minutes, 18.5 g. of solid polyacryamide forms in the solution. The nontacky, solid polymer is separated by filtration, washed, and dried as in Example 1. The reduced specific viscosity of the polyacrylamide is 12.5, corresponding to a molecular weight of about 4,500,000.

EXAMPLE 3

A solution containing 240 g. acrylamide, 800 ml. anhydrous liquid ammonia and 2.0 g. of azobis(isobutyramidine)hydrochloride is irradiated for 3 hours with a 4-watt blacklight fluorescent lamp at a temperature of about −30° C. Polyacrylamide forms in the solution. The suspension of solid polymer in ammonia is filtered, using a sintered glass funnel chilled to −45° C. The solid nontacky polyacrylamide is washed with liquid ammonia and dried to give 32.8 g. of polyacrylamide having a reduced specific viscosity of 6.9.

The mother liquor filtrate is returned to the reactor and irradiated for another 3 hours. An additional 10.5 g. of polyacrylamide ($\eta_{sp/c}=8.2$) is formed.

EXAMPLE 4

A solution containing 160 parts acrylamide, 49.5 parts ammonium acrylate, and 1.5 parts azobis(isobutyramidine)hydrochloride in 550 parts of anhydrous liquid ammonia is irradiated for 3 hours with a 4-watt blacklight fluorescent lamp at a temperature of about −30° C. as in Example 1. The polymerization gives 66.4 parts of solid, nontacky copolymer.

The reduced specific viscosity of the copolymer is 13.0. The copolymer is analyzed for its carboxyl content by converting the polymer to the acid form and titrating with base. The corresponding acrylate

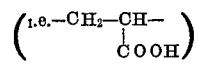

content of the polymer is 11.8% by weight.

EXAMPLES 5–14

The following experiments are carried out in a manner described in Example 4 except that the proportions of monomers are varied, with results shown in the following tabulation (Table I). These results illustrate that both the viscosity and the composition of the resulting copolymer can be adjusted by suitable control of the process conditions. In all cases a solid, nontacky polymer is formed that is easily removed from the liquid ammonia by filtration.

TABLE I.—COPOLYMERS OF ACRYLAMIDE AND ACRYLIC ACID

| Ex. | Parts | | | | Product | $\eta_{sp./cs.}$ | Acrylate in polymer, percent |
| | Anhydrous liquid ammonia | Acrylamide | Ammonium acrylate | Azo-type initiator | | | |
|---|---|---|---|---|---|---|---|
| 5 | 140 | 41.8 | 2.7 | 0.05 | 17.7 | 6.5 | 2.7 |
| 6 | 140 | 27 | 3.6 | 0.05 | 11.3 | 4.5 | 5.1 |
| 7 | 140 | 54 | 7.2 | 0.05 | 19.3 | 11.9 | 5.7 |
| 8 | 560 | 88 | 27.2 | 0.20 | 3.0 | 3.8 | 11.1 |
| 9 | 70 | 22.5 | 9.3 | 0.02 | 7.3 | 10.9 | 14.9 |
| 10 | 560 | 140 | 74.2 | 1.5 | 14.7 | 4.4 | 17.1 |
| 11 | 70 | 36 | 29.2 | 0.02 | 11.2 | 9.0 | 22.5 |
| 12 | 140 | 15 | 18.4 | 0.05 | 5.4 | 1.4 | 26.8 |
| 13 | 70 | 15 | 18.4 | 0.02 | 4.3 | 6.4 | 27.4 |
| 14 | 70 | 30 | 36.8 | 0.02 | 8.3 | 15.4 | 29.5 |

NOTE.—All reactions at atmospheric pressure and at the temperature of refluxing ammonia. Atmospheric displaced by nitrogen. Reaction mixture irradiated with light from a 100-watt medium pressure mercury arc except for Examples 8 and 10 which are irradiated with light from a 4-watt blacklight fluorescent lamp. Azo initiator is azobis(isobutyramidine)hydrochloride.

EXAMPLE 15

A solution containing 50 parts acrylamide, 10 parts freshly distilled methyl acrylate, 70 parts anhydrous liquid ammonia, and 0.05 part azobis(isobutyramidine)hydrochloride is irradiated with a 100-watt mercury arc lamp at a temperature of about −30° C. as in Example 2, for 1½ hours to produce 8.6 parts of solid, nontacky copolymer that is readily removed from the liquid ammonia by filtration. The reduced specific viscosity of the water-soluble copolymer is 3.9. This copolymer is swelled by liquid ammonia, whereas the homopolymer is not.

EXAMPLE 16

A solution containing 15 parts acrylamide, 23 parts vinyl chloride, 100 parts liquid ammonia and 0.05 part azobis(isobutyramidine)hydrochloride is irradiated for 2 hours with a 100-watt mercury arc lamp at a temperature of about −30° C. The solid, nontacky copolymer is recovered from the ammonia by filtration. The copolymer (14.3 parts) has a reduced specific viscosity of 3.5. The polymer contains 1.75% chlorine, which corresponds to a content of 3.0% vinyl chloride in the copolymer.

EXAMPLE 17

A solution containing 30 parts acrylamide, 100 parts liquid ammonia, 15 parts de-ionized water and 0.05 part of azobis(isobutyramidine)hydrochloride is irradiated with a Hanovia 100-watt medium pressure mercury arc lamp for one hour at a temperature of about −30° C. The reaction product separates as a spongy, somewhat cohesive mass from which the mother liquor can be separated by decantation, and which breaks into fine particles when stirred with methanol. The dried polyacrylamide (15.6 parts) has a reduced specific viscosity of 7.7, corresponding to a molecular weight of about 2,200,000.

EXAMPLE 18

A solution containing 100 g. acrylamide, 900 ml. anhydrous ammonia, and 0.16 g. azobis(isobutyronitrile) is irradiated for 6 hours with light from a 4-watt blacklight fluorescent lamp at a temperature of about −30° C. The solid, nontacky product is removed from the solution by filtration, washed with methanol and dried to give 6.0 g. of water-soluble polyacrylamide having $\eta_{sp/c}=6.1$.

EXAMPLE 19

A solution containing 74.7 parts acrylamide sulfate (which is equivalent to 30 parts acrylamide) and 30 parts deionized water is neutralized with gaseous ammonia. The neutralized mixture, containing acrylamide and ammonium sulfate, is added to 200 parts of liquid anhydrous ammonia. Ammonium sulfate separates as a solid that is removed from the mixture by filtration. The filter cake is washed with two 50-part portions of liquid ammonia. The combined filtrates and 0.05 part of azobis(isobutyramidine)hydrochloride are added to a flask, which is irradiated with light from a 100-watt medium pressure mercury arc for one hour at a temperature of about −30° C. The nontacky polyacrylamide (11.8 parts) is separated from the reaction mixture by filtration, washed with methanol, and dried. The polymer has a reduced specific viscosity of 3.7.

EXAMPLE 20

A solution containing 30 parts acrylamide, 150 parts liquid ammonia and 0.05 part azobis(isobutyramidine)hydrochloride is placed in a reactor cooled in a bath to −80° C. The reactor and contents are irradiated for 2¼ hours by light from a 100-watt medium pressure mercury arc lamp. The 1.7 parts of solid, nontacky polyacrylamide that forms has a reduced specific viscosity of 3.6.

EXAMPLE 21

A solution containing 100 parts acrylamide, 100 parts ammonium acrylate, 540 parts liquid ammonia, 50 parts 2-propanol and 0.1 part azobis(isobutyramidine)hydrochloride is irradiated for 4½ hours with a 100-watt mercury arc lamp at a temperature of about −30° C. The reaction yields 40.2 parts of solid, nontacky copolymer of reduced specific viscosity=1.9 that is readily recovered from the liquid ammonia by filtration. The copolymer incorporates 19% of the acrylate monomer and is of relatively low molecular weight because 2-propanol, a known chain transfer agent, is included in the reaction mixture to limit the degree of polymerization.

EXAMPLE 22

A solution of 25 parts acrylamide, 20 parts N-vinyl-2-pyrrolidone, 180 parts liquid anhydrous ammonia and 0.2 part azobis(isobutyramide)hydrochloride is irradiated for 2½ hours with a 100-watt medium pressure mercury arc lamp at a temperature of about −30° C. The polymer (29.6 parts) is a cohesive, elastic, nontacky, spongy mass in the liquid ammonia reaction mixture from which it is separated quite readily by decantation.

EXAMPLE 23

A solution of 25 parts acrylamide, 20 parts diallyldimethylammonium chloride, 180 parts liquid ammonia, and 0.1 part azobis(isobutyramidine)hydrochloride is irradiated with a 100-watt medium pressure mercury arc lamp for 4 hours at a temperature of about −30° C. The finely divided copolymer formed is nontacky and is easily recovered from the liquid ammonia by filtration. Analysis confirms the presence of about 3% diallyldimethylammonium chloride moieties in the copolymer product.

EXAMPLE 24

A solution of 45 parts acrylamide, 15 parts β-methacryloxyethyltrimethylammonium methosulfate, 180 parts liquid ammonia and 0.2 part azobis(isobutyramidine)hydrochloride is irradiated with a 100-watt medium pressure mercury arc lamp for 5½ hours at a temperature of about −30° C. A sticky ball of polymer forms, is easily separated by decantation of the mother liquor, and is converted to dry solid (6.3 parts) by treatment with methanol. The polymer has a sulfate content of 3.2% which corresponds to 9.4% of the comonomer in the acrylamide polymer.

EXAMPLE 25

A solution of 100 parts of acrylamide, 315 parts ammonium acrylate and 1500 parts of liquid ammonia containing 0.5 part of azobis(isobutyramidine)hydrochloride is irradiated for five hours with a medium pressure mercury arc lamp at a temperature of about −30° C. The resulting polymer is in the form of nontacky agglomerates and is recovered from the liquid ammonia by filtration. The recovered polymer, 69.5 parts, has a molecular weight of about 400,000 and contains 48% of acrylic acid moieties.

EXAMPLE 26

A solution of 45 parts anhydrous ammonia, 15 parts acrylamide and 0.05 part azobis(isobutyramidine)hydrochloride is placed in a glass tube chilled in Dry Ice and flushed with nitrogen. The tube is sealed and then placed in a water bath at 0° C. The tube is irradiated for two hours with a medium pressure mercury arc lamp. Sixty percent of the monomer is converted to polyacrylamide of reduced specific viscosity=4.6.

EXAMPLE 27

A solution of 18 parts anhydrous ammonia, 6.0 parts acrylamide, and 0.05 part azobis(isobutyramidine)hydrochloride is placed in a nitrogen-flushed glass tube chilled in Dry Ice. The tube is sealed and then placed in a water bath at 25° C. The tube is irradiated for one hour with a medium pressure mercury arc lamp. Conversion of 68% of the acrylamide to a polymer of reduced specific viscosity=3.3 is attained.

EXAMPLE 28

A solution of 100 parts acrylamide, 300 parts anhydrous ammonia, and 0.4 part azobis(isobutyramidine)-hydrochloride in a 100 ml. glass resin kettle is irradiated at atmospheric pressure with a medium pressure mercury arc lamp for 6¼ hours at about −30° C. The contents of the resin flask are added to a basket centrifuge to separate the solids from the mother liquors. The centrifuge cake is washed with additional liquid anhydrous ammonia. After drying the centrifuge cake, 63.2 parts of polyacrylamide of reduced specific viscosity=7.4 is obtained.

EXAMPLE 29

A solution of 30 parts acrylamide, 60 parts anhydrous ammonia, and 0.075 part of N,N'-azobis($\alpha,\gamma$-dimethyl-valeronitrile) at about −30° C. is irradiated with a medium pressure mercury arc lamp for one hour. The 3.2 parts of polyacrylamide which separates is removed by filtration of the reaction mixture. The reduced specific viscosity of the polymer is 3.4.

I claim:

1. A process for preparing polymers of acrylamide which comprises dissolving vinyl monomer containing acrylamide in an amount sufficient to produce a polymer having at least about 50 mol percent acrylamide moieties and an organic acyclic azo compound in a solvent consisting essentially of liquid ammonia containing less than about 25% water wherein the ratio by weight of vinyl monomer to ammonia is between about 1:1 and 1:50 and irradiating the mixture with radiation having a wave length of about from 175 to 500 millimicrons at a temperature below about 50° C. in substantial absence of oxygen while maintaining the ammonia as a liquid thereby producing solid, water-soluble polymer that is insoluble in said liquid ammonia, and recovering the polymer from the reaction mixture.

2. A process of claim 1 wherein the ratio of vinyl monomer to ammonia is from 1:2 to 1:10.

3. A process of claim 2 wherein the vinyl monomer is acrylamide.

4. A process of claim 2 wherein the vinyl monomer is a mixture containing acrylamide and one other vinyl monomer.

5. A process of claim 2 wherein the mixture is irradiated with energy having a wavelength of about from 300 to 400 millimicrons.

6. A process of claim 2 wherein the liquid ammonia is substantially anhydrous.

7. A process of claim 2 wherein the reaction is conducted at autogenous pressure.

8. A process of claim 2 wherein the azo compound is azobis(isobutyronitrile).

9. A process of claim 2 wherein the azo compound is azobis(isobutyramidine)hydrochloride.

10. A process of claim 2 wherein the azo compound is azobis($\alpha,\gamma$-dimethyl valeronitrile).

11. A process of claim 4 wherein the vinyl comonomer is ammonium acrylate.

12. A process of claim 4 wherein the vinyl comonomer is methyl methacrylate.

13. A process of claim 4 wherein the vinyl comonomer is vinyl chloride.

14. A process of claim 4 wherein the vinyl comonomer is N-vinyl-2-pyrrolidone.

15. A process of claim 4 wherein the vinyl comonomer is diallyldimethylammonium chloride.

16. A process of claim 4 wherein the vinyl comonomer is methacryloxyethyltrimethylammonium sulfate.

17. A process for preparing polyacrylamide which comprises dissolving an organic acyclic azo compound and acrylamide in a solvent consisting essentially of liquid ammonia containing less than about 25% water wherein the ratio by weight of acrylamide to ammonia is between about 1:2 to 1:10 and irradiating the mixture with radiation having a wave length of about from 175 to 500 millimicrons at a temperature below about 50° C. in substantial absence of oxygen while maintaining the ammonia as a liquid thereby producing solid water-soluble polyacrylamide that is insoluble in said liquid ammonia and recovering the polymer from the reaction mixture.

18. A process of claim 17 wherein the liquid ammonia is substantially anhydrous.

19. A process of claim 18 wherein the pressure is autogenous.

20. A process of claim 19 wherein the mixture is irradiated with energy having a wavelength of about from 300 to 400 millimicrons.

21. A process of claim 20 wherein the temperature is from about 0° to −30° C.

22. A process of claim 21 wherein the azo compound is azobis(isobutyramidine)hydrochloride.

References Cited

UNITED STATES PATENTS

| | | | |
|---|---|---|---|
| 3,509,113 | 4/1970 | Monagle et al. | 260—79.3 |
| 3,200,098 | 8/1965 | Goren | 260—87.5 |
| 3,515,657 | 6/1970 | Nananome et al. | 204—159.23 |

FOREIGN PATENTS

| | | |
|---|---|---|
| 1,106,573 | 3/1968 | Great Britain. |

OTHER REFERENCES

Chemistry of Acrylamide, American Cyanamid Co., pp. 18 and 19, 1969.

JOHN C. BLEUTGE, Primary Examiner

U.S. Cl. X.R.

204—159.22; 260—80.3 N, 86.1 N, 87.5 R, 88.3, 89.7 R